S. G. Williams.
Millstone Tool.
Nº 107,745. Patented Sep. 27, 1870.
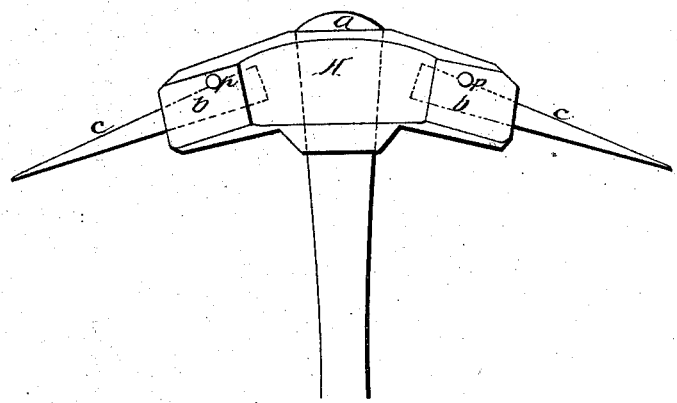
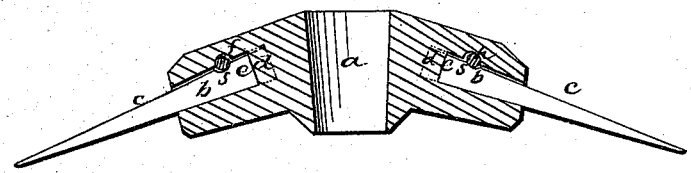
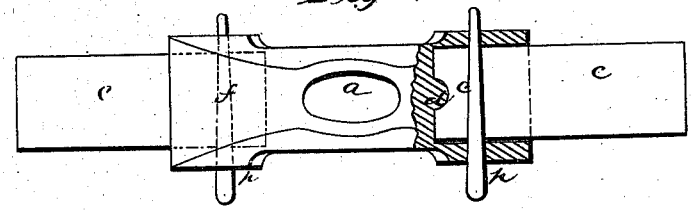
Witnesses:
J. D. Motte Smith
Samuel H. Williams
Inventor:
Stephen G. Williams

United States Patent Office.

STEPHEN G. WILLIAMS, OF TRUMANSBURG, NEW YORK.

Letters Patent No. 107,745, dated September 27, 1870.

IMPROVEMENT IN MILL-PICKS.

The Schedule referred to in these Letters Patent and making part of the same.

*To all whom it may concern:*

Be it known that I, STEPHEN G. WILLIAMS, of the village of Trumansburg, in the county of Tompkins and State of New York, have invented a new and Improved Mill-bill or Pick; and I do hereby declare that the following is a full, clear, and exact description of the same, reference being had to the annexed drawings which form a part of this specification, wherein—

Figure 1 shows a side perspective view.

Figure 2, a sectional view lengthwise through the center.

Figure 3, an end view, with part of the head at one end removed, to show one of the steel blades in full.

The letters used represent corresponding parts wherever they occur.

I make a head, H, of iron, brass, or other suitable metal, in the form of a hammer-head, double-faced, substantially in the form shown in the drawings, with a hole, $a$, for the handle, and with sockets, $b\ b$, to receive the blades or chisels $c\ c$, made of sufficient depth to securely hold the same therein, as hereinafter stated, and at the bottom of the socket projections $d\ d$, to receive the small sockets $e\ e$, in the inner end of the blades or chisels $c\ c$, made to conform thereto and prevent any side play, and with the pin-holes $f\ f$ so arranged that the pins $p\ p$ will pass in the slots $s\ s$ of the blades or chisels $c\ c$, and hold the same down to their places.

The line of the slots $s\ s$ should be a little forward of the center of the pin-holes $f\ f$, so that when the pins $p\ p$ are inserted, they will draw on the said blades and firmly hold them.

I make the blades or chisels $c\ c$ of steel, in a partially wedge shape, terminating in sharp edges, $g\ g$, with the sockets $e\ e$ and slots $s\ s$, and with the large end of suitable size to easily fit into the sockets $b\ b$ of the head H.

I make the pins $p\ p$ in size to suit the holes $f\ f$ and slots $s\ s$, and strong enough to hold down said blades, slightly tapering, so as to draw down and firmly hold the blades. I thus make a mill-pick convenient in form and shape, in which the blades or chisels can be readily exchanged while in use, or when worn out.

What I claim as my invention, and desire to secure by Letters Patent, is—

The combination of the head H, having socket-projections $d\ d$, and holes $f\ f$, the blades $c\ c$ having grooves or notches $e\ e$, and slots or cross-grooves $s\ s$, and the fastening-pins $p\ p$, all arranged substantially as and for the purpose herein specified.

STEPHEN G. WILLIAMS.

Witnesses:
SAMUEL D. WILLIAMS,
J. D. MOTTE SMITH.